G. HUNTINGTON.
Grain-Drill.
No. 42,290.  Patented Apr. 12, 1864.
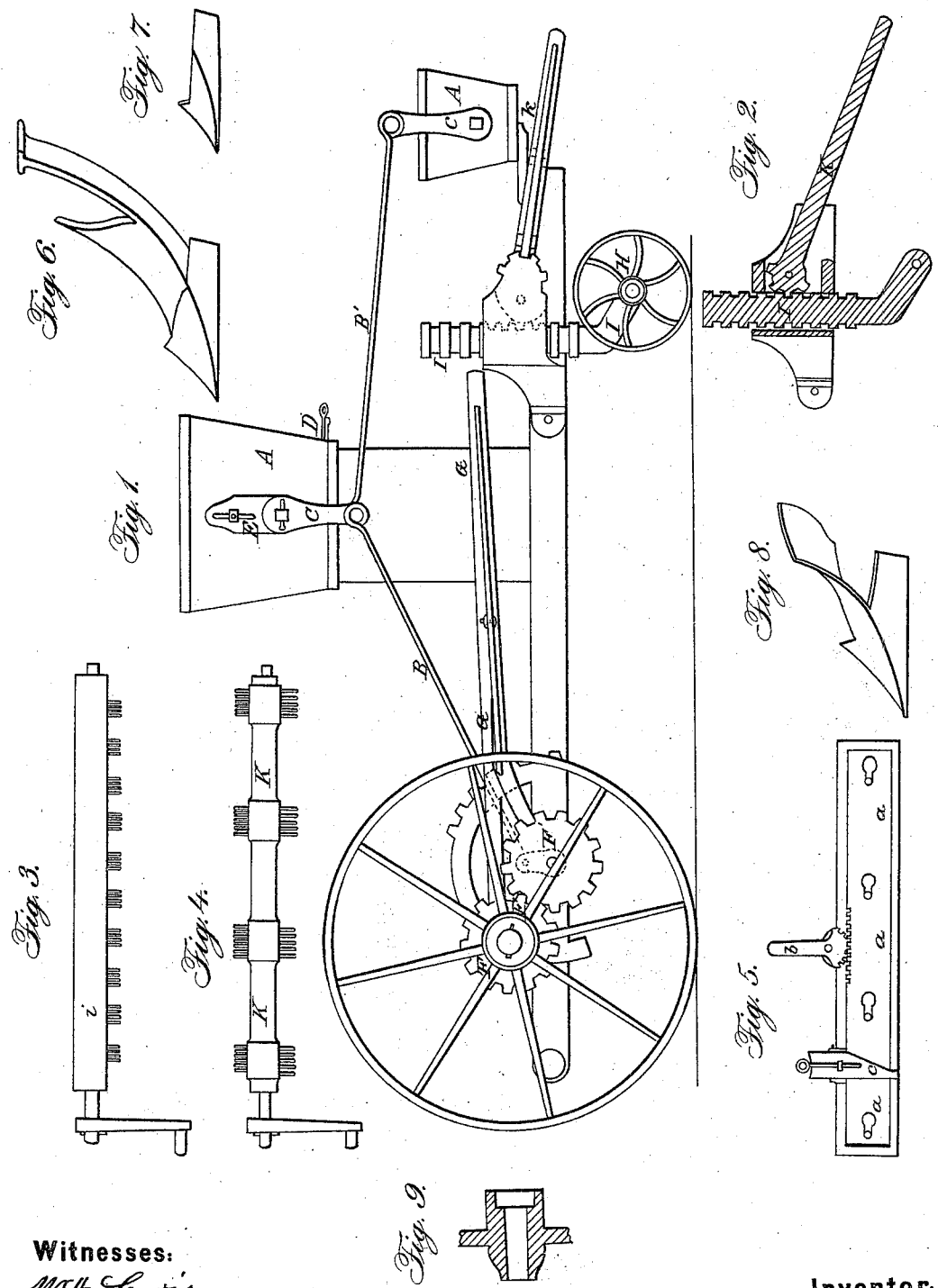
Witnesses:
W. H. Lewis
Gordon W. Lloyd
Inventor:
Gideon Huntington

UNITED STATES PATENT OFFICE.

GIDEON HUNTINGTON, OF NORWICHVILLE, CANADA WEST.

IMPROVEMENT IN GRAIN-DRILLS.

Specification forming part of Letters Patent No. 42,290, dated April 12, 1864; antedated March 28, 1864.

*To all whom it may concern:*

Be it known that I, GIDEON HUNTINGTON, a citizen of the United States, but now a resident of Norwichville, Canada West, have invented a new Combined Gang-Plow and Seed-Sower; and I do hereby declare that the following is a full and exact description of the construction and operation of the same, reference being had to the annexed drawings, making part of this specification, in which—

Figure 1 is a side view of the whole machine; Fig. 2, a transverse section of the swivel-wheel standard. Figs. 3 and 4 are views of the rollers inside of the grain and grass seed boxes, and Fig. 5 represents the movable slides $a\,a\,a$ at the bottom of the seed-boxes, with the manner in which the iron handle $b$ is worked.

The machine, when in working order, consists of a strong frame supported on three wheels, two of which are placed in front and one at the left-hand rear corner, (which wheel acts as a swivel,) in a manner hereinafter described. Firmly fastened to this frame on the under side is a series of plows or diagonal teeth, so placed with reference to each other as to turn the earth over and upon the furrow made by the preceeding tooth. On the upper side of this frame are one or more boxes with orifices in the bottom of each to admit of the escape of the seed into corresponding spouts which lead down from the grain-seed box through said frame and empty themselves behind each of the above-mentioned plows or teeth and into the furrow made by them, and from the grass-seed box the seed is distributed evenly over the ground behind and on top of the freshly-turned furrow-slice. Inside of the boxes are movable slides with corresponding orifices to those above described, and so arranged as to regulate the flow of seed into the spouts, and lying directly over these slides and supported at each end is a roller with wire brushes, coarse on one side and fine on the other, to suit the coarser or finer seeds in the grain-seed box, and which roller can be used either side up, and in the grass-seed box a roller with bristle brushes on one side only. Attached to the ends of these rollers on the outside of the seed-boxes A A are the connecting-rods B B, so arranged by means of the cranks C C as to give a vibrating motion to the rollers, which is done by said cranks being made longer than the driving one.

To the hub of one of the front wheels is fastened a cog-wheel, F, meshing into another cog-wheel, F', the shaft of which latter wheel passes through the fulcrum of the lever G, and on the opposite end of said shaft is the driving-crank.

The swivel-wheel H turns upon a point or pivot, I, which is in the form of a cogged standard in an upright socket, the cogs of which are continuous around the standard I and are made to mesh into corresponding cogs on the short arm or the lever K.

The action of this machine is as follows: When in motion (from any motive power whatever) the seed to be sown being first placed in the boxes and the movable slides opened to the desired width, a vibrating motion is given to the brushes by the means above described, thus preventing any clogging of the seed as it flows into the spouts. The depth of soil that is freshly turned upon the seed as it flows from the grain-seed box is regulated by means of the lever G in the front and the lever K in the back part of the machine, and can be altered at will and while in motion by means of the cog-wheels F F, above described, acting in conjunction with the lever G and the standard I with the lever K, as above mentioned. Thus by the combined action of these separate parts, as described, I gain the twofold object of a gang-plow and seed-sower in one and the same machine.

What I claim as my invention, and desire to secure by Letters Patent, is—

1. The combination and arrangement of the gear-wheels F F, lever G, and connecting-rods B B, when constructed and operating in the manner and for the purpose herein set forth.

2. The seed-roller K, provided with the coarse brushes on one side and fine brushes on the opposite side, as and for the purpose set forth.

3. The cogged pivot-standard I of wheel H, when constructed and operating in the manner and for the purpose herein set forth.

4. In combination with the standard I, the lever K, when arranged and operating in the manner and for the purpose set forth.

GIDEON HUNTINGTON.

Witnesses:
ALFRED RUPELL,
WILLIAM CREEVY.